Sept. 12, 1961 D. A. JENNY 2,999,926

SEMI-CONDUCTOR SIGNAL TRANSMITTING SYSTEMS

Filed Dec. 30, 1953

INVENTOR.
Dietrich A. Jenny

BY H. C. Allerton

ATTORNEY

United States Patent Office 2,999,926

Patented Sept. 12, 1961

2,999,926

SEMI-CONDUCTOR SIGNAL TRANSMITTING SYSTEMS

Dietrich A. Jenny, Princeton, N.J., assignor to Radio Corporation of America, a corporation of Delaware Filed Dec. 30, 1953, Ser. No. 401,304
2 Claims. (Cl. 250—17)

This invention relates to signal translating circuits and in particular to signal transmitting systems employing semi-conductor devices.

Compact transmitting systems find wide application, for example, in military operations in the field where information must be sent to a central command post. Portable signal transmitters may also be used with life raft and aircraft equipment to transmit S O S signals in cases of emergency. For these and other applications, it has been necessary in the past to utilize power storage devices such as dry cell batteries to provide the operating power. Thus the bulk of the equipment was increased, and the batteries had to be constantly serviced and replaced.

The requirements of transmitters adapted to the above mentioned as well as other similar applications include compactness and lightness. Some source of power must also be provided which is preferably light in weight and which has a long useful life.

It is, accordingly, an object of the present invention to provide an improved and effective signal translating circuit of the type referred to utilizing a semi-conductor device which does not require a local source of operating power.

It is another object of this invention to provide an improved signal transmitting system utilizing a transistor circuit to which operating power may be supplied in response to applied acoustic or sound energy.

It is a further object of the present invention to provide a voice-powered signal transmitting system which may effectively operate with a single transistor as the active element thereof.

Another object of the present invention is to provide a voice-powered transistor transmitter which is compact and light in weight, requires a minimum of maintenance attention and provides improved operational characteristics.

These and other objects and advantages of the present invention are achieved, in general, by transforming acoustic energy such as voice energy into electrical energy which is utilized to perform two functions in an improved transistor oscillator circuit. For one function, a portion of the derived electrical energy is used to modulate the oscillator circuit. For the other, another portion of this energy is used to supply operating power for the transistor oscillator circuit. Thus, a source of operating power having weight and bulk, such as a battery, is not required. In another aspect of the invention, two separate microphones are utilized, one to apply a modulating signal and the other to supply power for the system.

Figure 1:
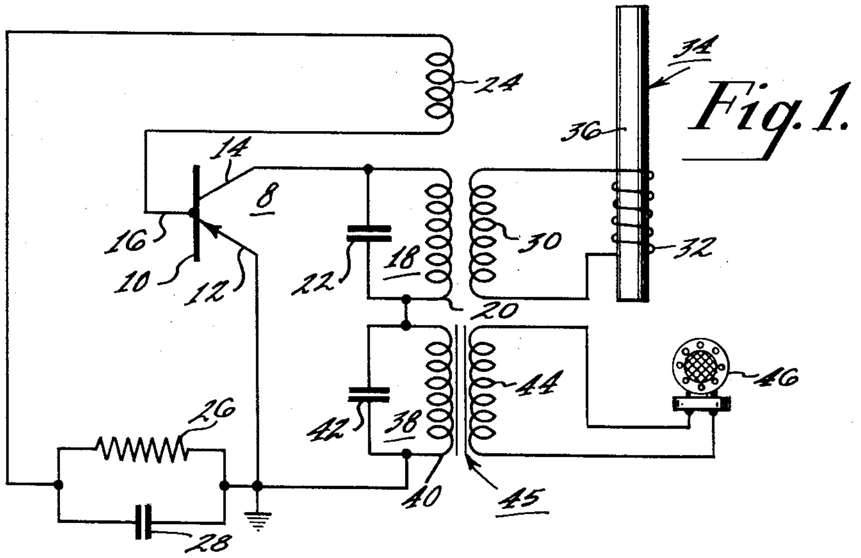
Figure 2:
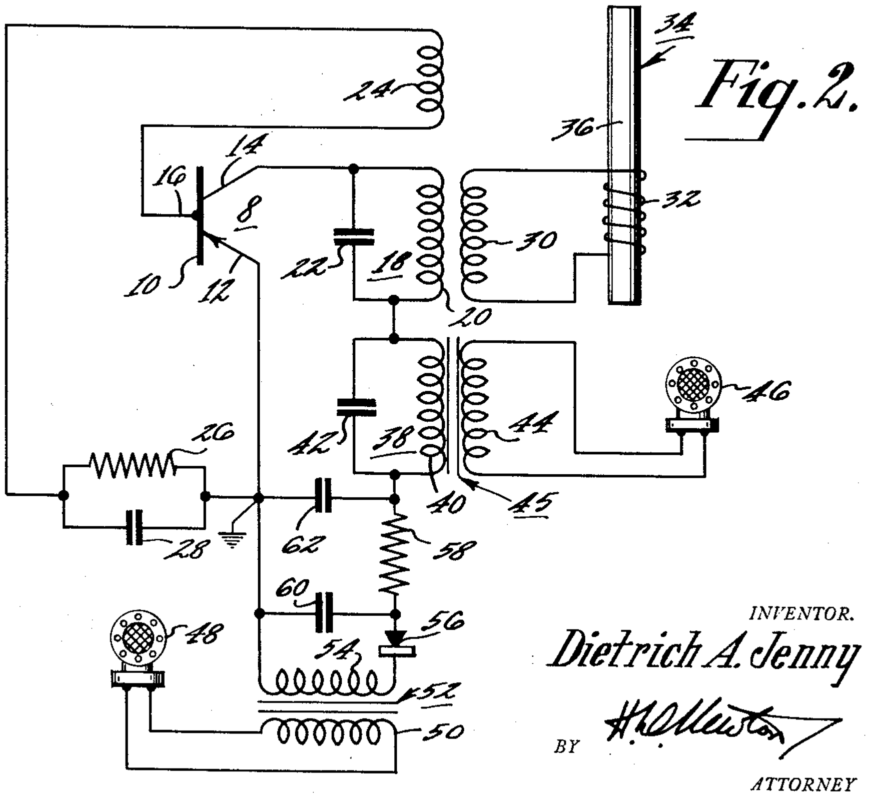

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

FIGURE 1 is a schematic circuit diagram of a radio signal transmitting system illustrating one embodiment of the present invention; and FIGURE 2 is a schematic circuit diagram of a radio signal transmitting system illustrating another embodiment of the present invention.

Referring now to the drawing, wherein like elements are indicated by like reference numerals in both figures, and referring particularly to FIGURE 1, a transmitting system includes a transistor 8, which is preferably of the junction type and in the present example is a P–N–P junction transistor. The transistor 8 comprises a semi-conductive body 10 and three contacting electrodes which have been designated as an emitter 12, a collector 14 and a base 16. An oscillator tank or frequency determining circuit 18 is connected with the collector 14 and comprises an inductor 20 in shunt with a capacitor 22 which may be variable for tuning the tank circuit to a desired frequency which will determine the frequency of oscillation. To provide regenerative feedback an inductor 24 is inductively coupled with the inductor 20 and is connected with the base 16 and through a self-biasing network comprising a resistor 26 and a capacitor 28 in parallel, to the emitter 12. In this manner, the necessary feedback from the output circuit to the input circuit is obtained for sustained oscillation.

The tank circuit 18 also comprises a tunable output circuit for the transmitting system. To this end, an inductor 30 is inductively coupled with the inductor 20 of the tank circuit. The terminals of the inductor 30 are connected to the input winding 32 of a transmitting antenna, shown here as a loop antenna 34. The loop antenna may be of any suitable type and in the present example comprises an elongated ferrite rod 36 of the well known type.

An input circuit 38 for the transmitter, in accordance with the invention comprises an inductor 40 which is the secondary winding of an input transformer 45 and is shunted by a capacitor 42, which may be variable. The primary winding 44 of the transformer 45 has its terminals conductively connected with a modulating element such as, for example, a microphone 46. In accordance with the present invention, the microphone 46 is also the power or biasing source for the transistor 8. Thus, in operation, acoustical or sound energy, when applied to the microphone, as by a person speaking, will be converted into electrical energy (i.e., an alternating current) which is applied to the transmitter by way of the input circuit 38. This energy is used for two purposes. For one, it has been found to be sufficient for supplying operating or biasing potentials for the transistor 8. Secondly, this energy is used to modulate the oscillator circuit.

Thus, when the microphone is energized, the transistor 8 will also be energized and energy will be fed back from the inductor 20 by means of the mutual coupling between it and the feedback inductor 24 to the base 16 of the transistor. This feedback energy is provided in phase and magnitude, through the coupling shown, to overcome the losses in the circuit and thereby sustain continuous oscillation. Amplitude modulation of the generated oscillator energy, as was explained hereinbefore, is produced by applying electrical energy or signals from the microphone to the transmitter through the input circuit 38. The modulated oscillator signals are then coupled through the winding 30 of the oscillator tuned circuit to the antenna 34 where they are radiated.

It is apparent, therefore, that in accordance with the teachings of the present invention, a compact transmitter is provided which uses a source of acoustical or sound energy as both a biasing means and for modulation purposes. Thus, an external or local source of operating power is not required nor is an external signal such as a carrier wave needed for operation of the transmitter. Hence, a transmitter embodying the present invention is characterized by extreme simplicity resulting in a compact and lightweight structure.

While the circuit illustrated in FIGURE 1 has been tested and operated, its efficiency can be increased by using two sources of energy, one for modulating purposes and the other for providing a direct current biasing voltage. This may be done as in FIGURE 2 where a transmitter of the same general type as the one illustrated in FIGURE 1 includes in general a transistor 8, a tuned oscillator or tank circuit 18, a loop antenna 34, and a tuned input circuit 38 connected to be operative as in FIGURE 1. In addition, the microphone 46 is connected to the primary winding 44 of the input transformer 45.

Rather than performing the two functions of biasing and modulating, however, the microphone 46 is used primarily as the modulating source. Biasing potentials are obtained by a second microphone 48 such as, for example, a throat microphone, which is conductively coupled to the inductor 50 which comprises the primary winding of a transformer 52. One end of the secondary winding 54 of the transformer 52 is connected directly with the emitter 12 while the other end is connected through a rectifier 56 and a resistor 58 to the low voltage end of the tuned input circuit 38. The rectifier 56 may be any non-linear conducting device such as a vacuum tube rectifier but is preferably a junction rectifier. The resistor 58, in combination with a pair of parallel capacitors 60 and 62 comprise a filter circuit for the rectifier 56.

In operation, voice energy is converted into an alternating current by the throat microphone 48. This current is coupled through the transformer 52 to the rectifier 56. The rectified current passes through the filter circuit and develops a charge on the capacitor 62. This is used as the source of biasing voltage for the transistor 8. As in FIGURE 1, energy will be fed back from the inductor 20 of the tank circuit 18 by means of the mutual coupling between it and the feedback inductor 24 to the base 16. The energy so fed back is sufficient to overcome the losses in the circuit and maintain continuous oscillation. Amplitude modulation of the oscillator signals is produced by applying the output signals from the microphone 46 to the circuit through the input circuit 38. Modulated oscillator signals are then coupled through the oscillator tuned circuit and winding 30 to the antenna 34, where they are radiated.

The circuit of FIGURE 2 thus uses two microphones for converting sound energy into alternating currents. One of these microphones is used for modulating purposes and the other is used to develop a biasing or energizing voltage. Thus, the transmitter illustrated in FIGURE 2 is also characterized by compactness and lightness and no external or local source of power is required. It is obvious, of course, that a single rather than separate input circuits for each microphone could be used if desired.

While the invention has been illustrated with the use of P–N–P junction transistors, it should not be considered exclusive thereto Thus, an N–P–N junction transistor could be used by reversing the direction of the rectifier in the circuit of FIGURE 2. Furthermore, other semi-conductor devices exhibiting similar characteristics may be used within the scope of the invention.

As described herein, a transmitter system in accordance with the invention provides an improved modulated oscillator circuit utilizing transistors. The transistor is biased and operated from a voltage derived from a source of acoustic or sound energy. As a result, no local source of power is required to operate the transmitter system. The resulting device is compact and requires little maintenance.

What is claimed is:

1. In a signal transmitting system including a semiconductor device having base, emitter and collector electrodes, the combination comprising, a tunable tank circuit connected with said collector electrode, means providing regenerative feedback between said collector and base electrodes of said device to provide oscillator signals over a range of frequencies, and a first and a second microphone each conductively coupled with said collector electrode, said first microphone being effective to modulate said oscillator circuit and said second microphone having circuit connections effective to apply biasing potentials to the electrodes of said device, said second microphone being the sole source of biasing potential for said device.

2. In combination with an amplitude modulated oscillator circuit including a semi-conductor device having a semi-conductive body and base, emitter and collector electrodes cooperatively associated therewith, a first means for converting applied acoustical energy into electrical energy, means including a rectifier circuit coupled between said first means and said device and operative to apply direct current biasing potentials to said device, said direct current biasing potentials from said rectifier providing the sole source of biasing potentials for said device, a second means for converting said acoustical energy into electrical energy, said second means being connected to amplitude modulate said oscillator circuit, and an output circuit for said oscillator circuit tunable to modulated oscillator signals connected with the collector electrode of said device.

References Cited in the file of this patent

UNITED STATES PATENTS

| | | |
|---|---|---|
| 1,441,029 | Round | Jan. 2, 1923 |
| 1,631,917 | Cook et al. | June 7, 1927 |
| 1,680,086 | Carlson | Aug. 7, 1928 |
| 1,686,018 | Loewe | Oct. 2, 1928 |
| 2,383,832 | Williams | Aug. 28, 1945 |
| 2,482,148 | Beckman et al. | Sept. 20, 1949 |
| 2,486,776 | Barney | Nov. 1, 1949 |
| 2,522,389 | Mason | Sept. 12, 1950 |
| 2,632,812 | Cooney | Mar. 24, 1953 |
| 2,676,273 | Oestreicher | Apr. 20, 1954 |

OTHER REFERENCES

Radio-Electronics, vol. 24, No. 8, August 1953, p. 66, "Transistor Oscillator Is Powered by Light," by Rufus P. Turner.